(12) United States Patent
Yi et al.

(10) Patent No.: US 6,586,123 B1
(45) Date of Patent: Jul. 1, 2003

(54) VARIABLE STOCHIOMETRY FUEL CELL

(75) Inventors: Jung S. Yi, Mansfield, CT (US); Jonathan Puhalski, Winsted, CT (US)

(73) Assignee: UTC Fuel Cells, LLC, South Windsor, CT (US)

(*) Notice: Subject to any disclaimer, the term of this patent is extended or adjusted under 35 U.S.C. 154(b) by 38 days.

(21) Appl. No.: 09/778,513

(22) Filed: Feb. 7, 2001

(51) Int. Cl.$^7$ .......................... H01M 8/00; H01M 8/04; H01M 8/12

(52) U.S. Cl. .............................. 429/13; 429/22; 429/23; 429/25

(58) Field of Search .............................. 429/22, 12, 25, 429/13, 34, 23

(56) References Cited

U.S. PATENT DOCUMENTS

| | | | |
|---|---|---|---|
| 4,046,956 A | * | 9/1977 | Fanciullo ..................... 429/20 |
| 4,904,548 A | * | 2/1990 | Tajima ......................... 429/22 |
| 5,366,821 A | | 11/1994 | Merritt et al. |

FOREIGN PATENT DOCUMENTS

JP  4-26069  *  1/1992  ............ H01M/8/04

* cited by examiner

*Primary Examiner*—Patrick Ryan
*Assistant Examiner*—Julian Mercado
(74) *Attorney, Agent, or Firm*—M. P. Williams (57) ABSTRACT

A fuel cell having a polymer electrolyte membrane (16) between anode (14) and cathode (18) reactant flow fields includes a variable blower (32), the power control signal (61) of which is provided by a controller (75) in response to a current signal (63) indicative of the current of the load (71) sensed by a current detector (68). The controller responds to a schedule of blower power as a function of load current density to provide a stochiometry, S, which is fixed at a stochiometry of A, plus or minus a range of stochiometries, D, below a certain current density, C, and varies with higher current densities as: $S=[A+B(i-C)]\pm D$, where B is he slope of stochiometry as a function of current density, and i is the actual current density.

11 Claims, 8 Drawing Sheets

VARIABLE STOCHIOMETRY FUEL CELL

TECHNICAL FIELD

This invention relates to an atmospheric polymer electrolyte membrane (PEM) fuel cell having stochiometry controlled by a schedule of blower power as a function of load current.

BACKGROUND ART

The amount of air consumed in a fuel cell by the fuel cell process is called the "stochiometric" amount. The ratio of (a) the total amount of air supplied to the oxidant flow field to (b) the stochiometric amount of air is typically (and herein) referred to as "stochiometry". Sometimes stochiometry is referred to as a percentage: thus, a stochiometry of 333 implies 333%, and is the same as a stochiometry of 3.3 (as used herein). The phase "air utilization" refers to the reciprocal of stochiometry, and is the percent of total air which is consumed: utilization of 30 (implying 30%) equals stochiometry of 3.3 or 333 (implying 333%).

Most conventional fuel cells known to the prior art are operated with a substantially constant stochiometry of between 2 and 3.5, typically. Such a choice strikes a balance between the additional oxidant required at high load currents and the need to limit the wasted parasitic power which results from excessive compression of oxidant. It has been suggested in U.S. Pat. No. 5,366,821 that a PEM fuel cell operating at one or two atmospheres can adjust air flow either (1) to keep the output voltage constant for any current load, or (2) to provide optimal operation in which the parasitic power (mostly utilized to operate a compressor) is minimized, or (3) to maintain a fixed oxygen utilization ratio. In that patent, the compressor provides compressed air to a storage tank which has a setpoint pressure, and the compressor is utilized to maintain the setpoint pressure in the air storage tank. Flow regulation is accomplished by calculating a desired flow rate, monitoring the air flow input to, and current output of the fuel cell, and regulating the air flow through the fuel cell by means of flow control valves. While describing achievement of the foregoing objectives separately, the achievement of one objective precludes achievement of either of the other objectives. The choices include: controlling flow and stochiometry for a constant voltage at all load currents, at a penalty of high parasitic power; controlling flow for minimized parasitic power at a penalty of wide variations in output voltage and power as a function of load current; and controlling flow for a constant stochiometry at a penalty of variable voltage and power as a function of load current and increased parasitic power at both higher load current and lower load current. The parasitic power in any PEM fuel cell employing a compressor will be prohibitive for use in vehicles.

DISCLOSURE OF INVENTION

Objects of the invention include improved PEM fuel cell operation at near atmospheric pressure; PEM fuel cells operating near atmospheric pressure having output voltage which decreases moderately as a function of load current; and PEM fuel cells operating near atmospheric pressure having improved characteristics rendering them more suitable for use in vehicles.

This invention is predicated on the discovery that a moderate increase in air stochiometry as a function of load current will improve the operating characteristics of PEM fuel cells operating at substantially atmospheric pressure.

According to the present invention, the mass flow rate of air in PEM fuel cells operating at substantially atmospheric pressure is increased beyond stochiometric amounts so as to control stochiometry as a function of load current, in response to a schedule of pump or blower power as a function of load current. In accordance further with the invention, the stochiometry of a PEM fuel cell operating near atmospheric pressure is increased as a function of load current by increasing the speed of an oxidant pump or blower at the inlet or outlet of an oxidant flow field. In further accord with the invention, the stochiometry is increased at a rate of between 1.7 per amp/cm$^2$ and 2.5 per amp/cm$^2$, for current densities above a threshold. The pump or blower may be controlled by variable input voltage, by duty cycle switching of input voltage, or in any other known fashion.

The present invention recognizes that neither the parasitic power, the voltage, nor any other parameter of a fuel cell can be controlled to its optimum while at the same time controlling another of such parameters to a corresponding optimum. Instead, the invention recognizes that there are advantages to variable stochiometry which can be achieved for a number of parameters at one time, if the stochiometry is altered in an appropriate fashion. For instance, even though voltage cannot remain constant, limiting the variations in voltage as a function of load current simplifies the power conditioning equipment which is used as a part of every fuel cell power plant, thus reducing the size, the weight and the cost thereof. This renders the fuel cell, with its power conditioning equipment, more suitable for certain uses, such as in vehicles. Furthermore, adjusting the stochiometry in accordance with the present invention, in contrast with utilizing a fixed stochiometry which is conventional in the prior art, improves the water self-sufficiency of the fuel cell process.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
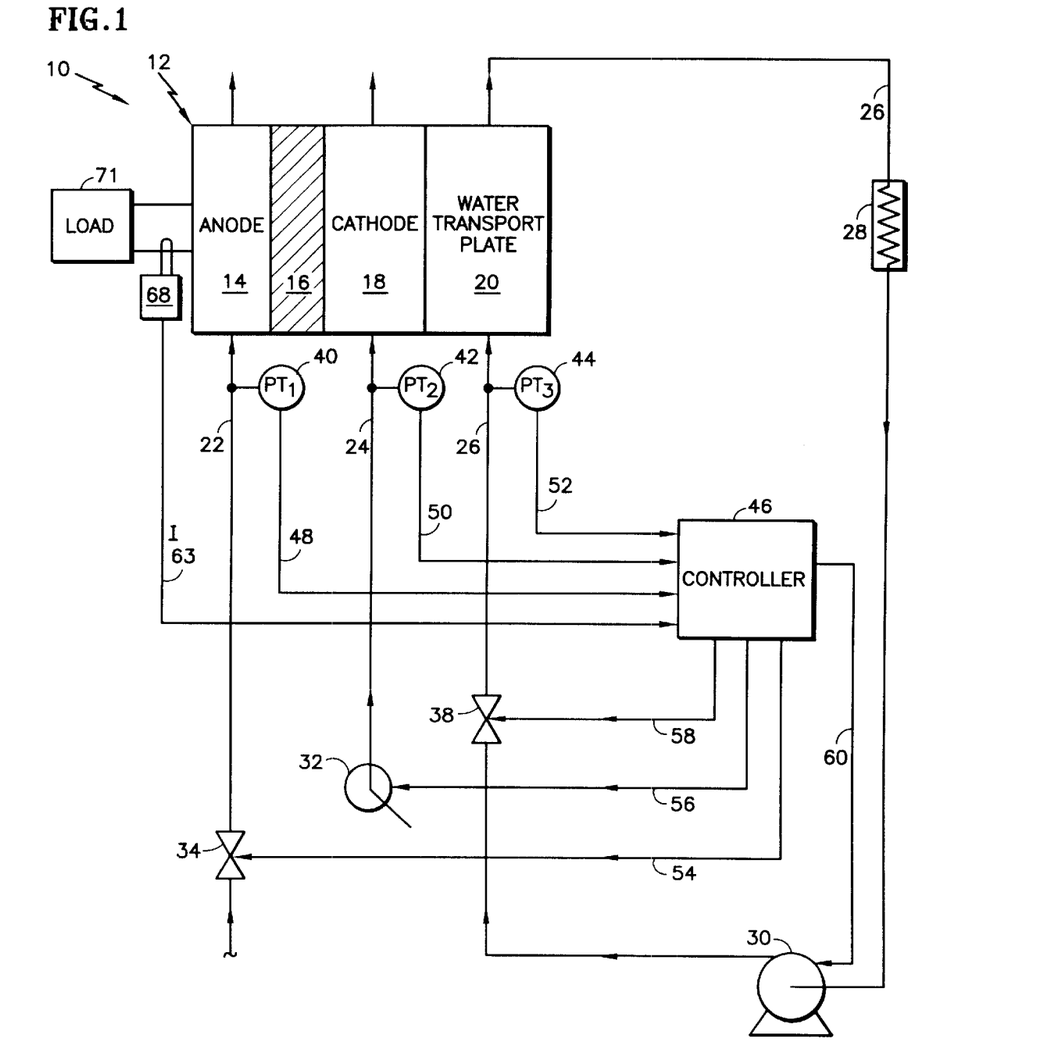
FIG. 1 is a schematic illustration of a known fuel cell power plant which however is modified to include a variable speed pump or blower in accordance with the present invention.

Referring to FIG. 1, a PEM fuel cell power plant 10 typically comprises a plurality of fuel cells 12, which are electrically connected in series and referred to as a cell stack assembly. However, for the purpose of clarity in explaining the present invention, one fuel cell 12 is described. Each fuel cell 12 includes an anode support plate 14, a cathode support plate 18 and a membrane electrolyte assembly (MEA) 16 disposed between the anode support plate 14 and the cathode support plate 18. Both support plates typically contain a porous electrode substrate and a reactant flow field. The fuel reactant gas stream 22 supplies the fuel flow field of the anode support plate 14 with the fuel reactant gas, such as hydrogen from a fuel supply (not shown), and the oxidant reactant gas stream 24 supplies the oxidant flow field of the cathode support plate 18 with oxidant reactant gas. The oxidant reactant gas is air, pressurized by a pump or blower 32. As the reactant gases pass through the fuel cell 12, product water forms at the cathode side of the MEA 16. Also, water in the fuel reactant gas stream 22 passes through the MEA 16 and enters the cathode support plate 18.

A water transport plate 20 serves to remove some of the product water from the cathode support plate 18 and incorporate such water into the coolant stream 26. The water transport plate 20 also cools the fuel cell 12. Hence the water transport plate 20 is occasionally referred to as a cooler plate. The coolant stream 26, fuel reactant gas stream 22 and oxidant reactant gas stream 24 are in fluid communication with each other through the water transport plate 20. It is preferable to manage the water within the PEM fuel cell power plant 10 within the water transport plate 20. Examples of water management systems include maintaining a positive pressure differential between the reactant gases and the coolant water, as illustrated in U.S. Pat. Nos. 5,503,944 and 5,700,595, incorporated herein by reference. Operating the fuel cell power plant 10 such that the pressure of the oxidant reactant gas stream 24 is greater than the pressure of the coolant stream 26 ensures the movement of the product water from the cathode 18 toward the water transport plate 20.

When a hydrophilic substrate layer is included within the anode support plate 14 and/or cathode support plate 18, it is necessary to operate the fuel cell power plant 10 such that a pressure differential exists between the fuel reactant gas stream 22 and coolant reactant gas stream 26, as well as between the oxidant reactant gas stream 24 and coolant stream 26, in order to prevent the cathode support plate 18 or anode support plate 14 from flooding. More specifically, the pressure differential establishes a preferred ratio of coolant to reactant gas within the hydrophilic substrate. The percentage of liquid to reactant gas is a function of the pore size of the hydrophilic substrate and the pressure differential between the reactant and coolant streams. Each hydrophilic substrate has a predetermined pore size and predetermined porosity. If the pressure differential decreases, the percentage of pores filled with water increases. Furthermore, in the absence of a pressure differential between the liquid pressure and the reactant gas pressure, the percentage of pores filled with water will approximate 100%, thereby flooding the cathode. Flooding the cathode will prevent the oxidant reactant gas from reaching the catalyst layer because the majority of pores will be filled with water and the electrical performance will diminish. The preferred percentages of pores filled with reactant gas and water is dependent upon the size of the pores within the substrate layer and the pressure differential between each reactant gas stream 22, 24 and the coolant stream 26. The percentage of pores containing liquid or reactant gas will be controlled by the respective pressures of the coolant stream 26 and reactant gas 22, 24 streams, wherein the reactant gas streams 22, 24 will typically have a greater pressure than the coolant gas stream 26. Specifically, because the pressure of the reactant gas streams 22, 24 are typically equal to about ambient pressure, the pressure of the coolant stream 26 is less than ambient pressure. Moreover, the pressure differential between the coolant stream 26 and the reactant gas streams 22, 24 will typically be in the range of about 0.5 psi to 5.0 psi.

As illustrated in FIG. 1, one such means for maintaining a positive pressure differential between the reactant gas streams 22, 24 and the coolant stream 26 comprises circulating water through the coolant stream 26, which is cooled by a heat exchanger 28 and pressurized by a pump 30. The pump 30 establishes a predetermined coolant water pressure in the coolant stream 26. This pressure may further be regulated by a variable valve 38, which is located in the coolant stream 26 just prior to the water transport plate 20. If the pump 30 is a fixed rate pump, the valve 38 will be useful for varying the coolant pressure in the event that pressure adjustments are necessary. A pressure transducer 44, disposed downstream of the pump 30 and valve 38, serves to measure the pressure of the coolant water stream before it enters the water transport plate 20. The pressure transducer 44, the valve 38 and the pump 30 may be connected to a power plant microprocessor controller 46 via lines 52, 58, and 60, respectively. Coolant stream pressure input from the pressure transducer 44 will cause the controller to regulate the pump 30 and/or the valve 38 when necessary to achieve a target coolant stream pressure.

The oxidant reactant gas stream 24 may contain a downstream pressure transducer 42 which measures the pressure of the oxidant gas stream as it enters the cathode support plate 18. The pressure transducer 42 is connected to the system controller 46 via line 50.

The fuel reactant stream 22 is typically fed from a pressurized container, or a pressurized fuel conditioning or reforming system (not shown). A variable valve 34, connected to the system controller 46 by a line 54, is operable to regulate the pressure of the fuel reactant as it enters the anode support plate 14. The fuel reactant pressure is monitored by a pressure transducer 40, which is connected to the system controller 46 by a line 48. It is preferred to operate a fuel cell power plant at near ambient pressure because doing so removes the need to compress the air to elevated pressures and eliminates one source of parasite power, thereby improving the power plant's overall operating efficiency.

The foregoing is a partial description of a fuel cell power plant set forth in commonly owned U.S. patent application Ser. No. 09/733,133 filed on Dec. 8, 2000.

According to the invention, the pump or blower 32 used to pressurize air oxidant is variable, and is connected with the controller 46 by a line 56. The controller 46 can thus command the oxidant reactant pressure required to achieve the stochiometry/current relationship set forth in the schedule.

Figure 2:
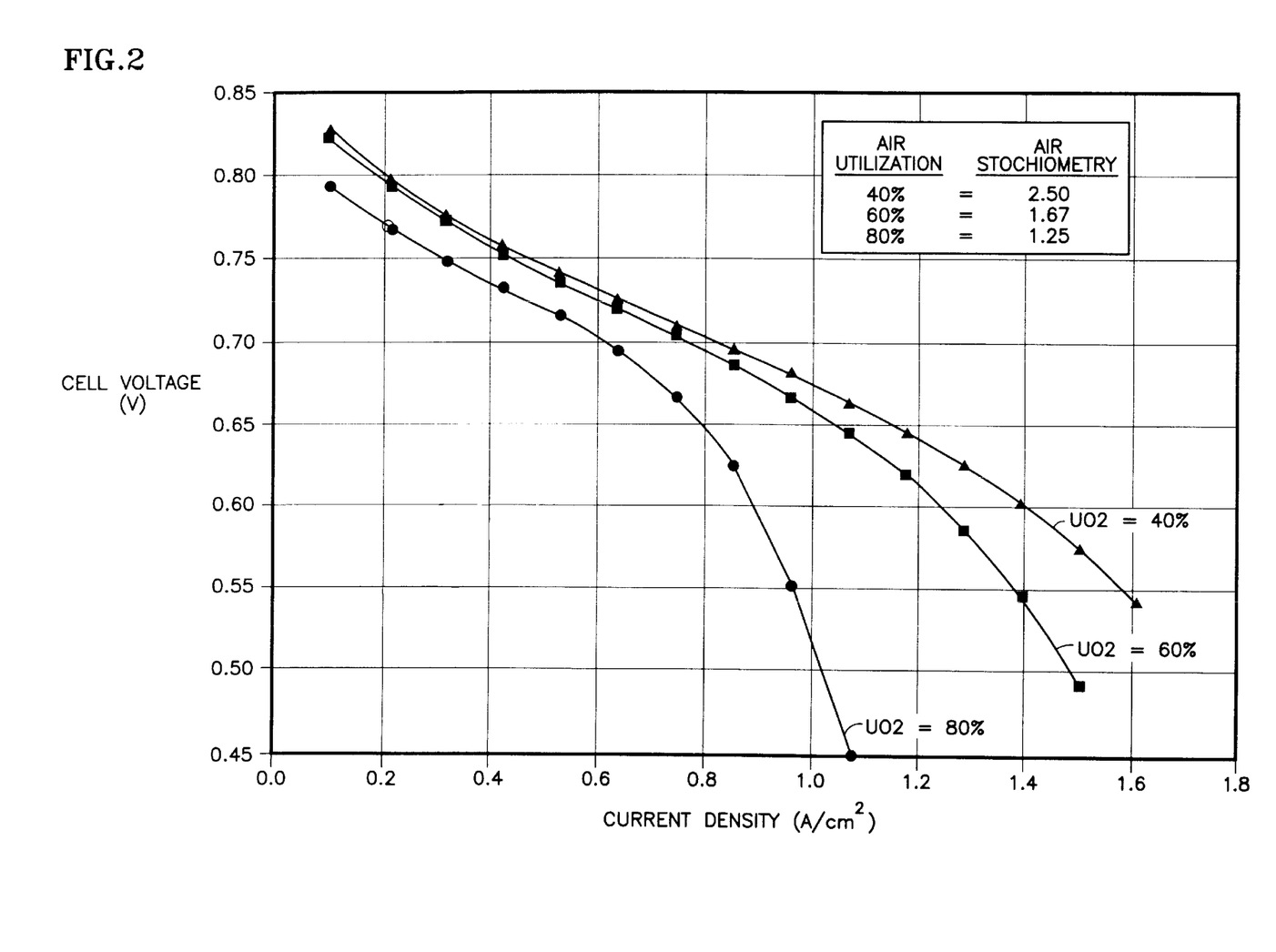
FIG. 2 is a plot of cell voltage as a function of current density of a fuel cell operating substantially at atmospheric pressure, not employing the present invention.

When a fuel cell is configured in accordance with said copending application so as to have the configuration described therein by a solid black triangle symbol, the cell voltage is very dependent upon current density as well as air utilization, which is referred to herein as "stochiometry", as illustrated in FIG. 2.

Figure 3:
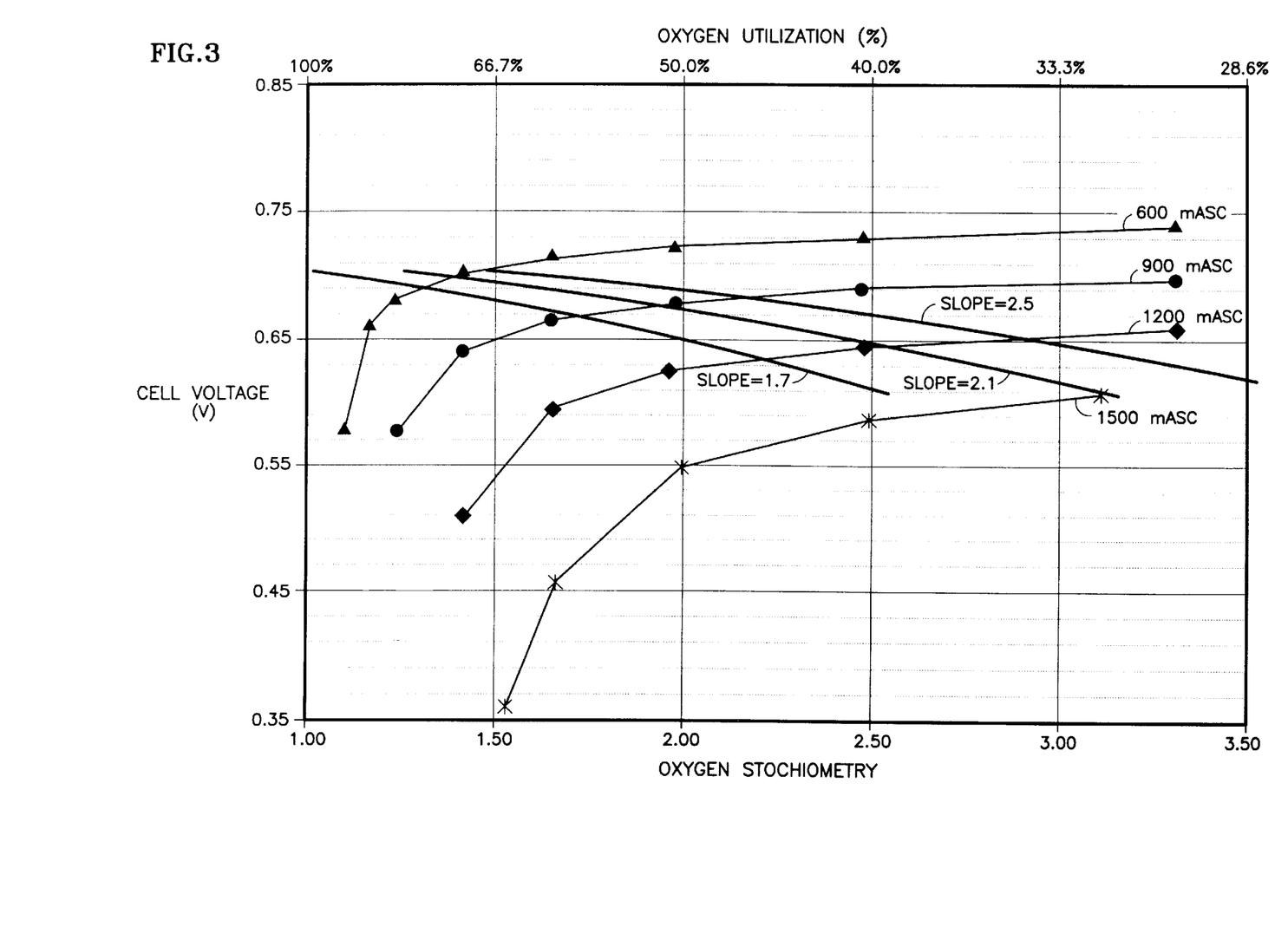
FIG. 3 is a plot of cell voltage as a function of oxygen stochiometry for a variety of load currents, having plotted thereon a range of stochiometry as a function of load current schedules, according to the present invention.

The same performance is plotted in a different relationship in FIG. 3, to illustrate how the cell voltage varies with stochiometry for different load currents. In FIG. 3, three arbitrary schedules are shown with slopes of 2.5 per A/cm$^2$, 2.1 per A/cm$^2$, and 1.7 per amp/cm$^2$. To hold the voltage relatively constant at approximately 0.66 volts in a range of from 600 mA/cm$^2$ (milliamp per square centimeter) to 1200 mA/cm$^2$, the stochiometry would need to vary from about 1.25 (at 600 mA/cm$^2$) to about 3.33 (at about 1200 mA/cm$^2$), having a stochiometry slope of about 3.3 per A/cm$^2$. This would require using a low stochiometry (less than 1.5) for nominal, mid-range (average) power operation, causing reduced efficiency. It also would not maintain 0.66 volts for current densities above 900 mA/cm$^2$. Holding the voltage constant for 1500 mA/cm$^2$ and below would limit the voltage to about 0.61 volts, significantly reducing the cell output power.

Figure 4:
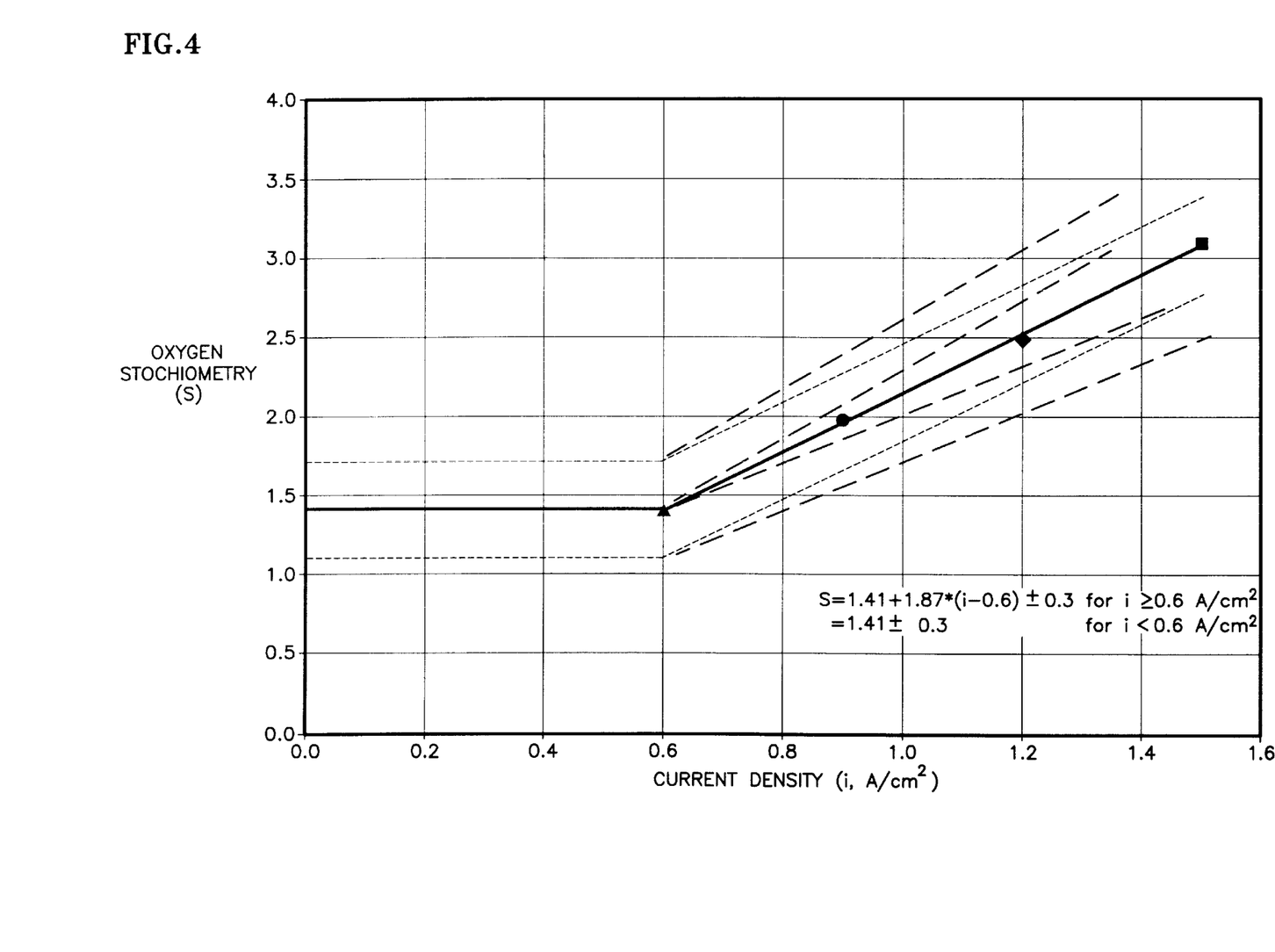
FIG. 4 is a plot of the load schedules of FIG. 3 expressed as oxygen stochiometry as a function of current density.

In FIG. 4, an exemplary range of stochiometry schedules, according to the invention, are independent of current density below 0.6 A/cm$^2$, although that number can vary in any given utilization of the invention. The solid line below 0.6 A/cm$^2$ is a stochiometry of 1.4±0.3; above 0.6 A/cm$^2$, it is 1.4+1.92 (i–0.6)±0.3. The dash lines show a range of slopes of between 1.55 per A/cm$^2$ and 2.22 per A/cm$^2$. Thus, the invention has a stochiometry schedule of:

$$A+B(i-C)\pm D$$

where A varies from one cell stack to the next, but may be in a range of 1.1 to 1.7; B is selected to suit a particular cell stack and its use, but may be in a range of 1.55 per A/cm$^2$ to 2.22 per A/cm$^2$; i is the current density in amps per square centimeter; C is the change-over current density, which also varies with the cell stack and its use, but may be about 0.6 A/cm$^2$; and D is a range of stochiometries which may be selected, and is illustrated in the example of FIG. 4 as being between zero and 0.3 stochiometry units, about 20% of A. These define the range of schedules of stochiometry as a function of current density according to the invention. With such a schedule, at low power (low current density), low stochiometry may be used not only to reduce parasitic power but to also increase the water recovery capability. But then, at higher power (higher current density), the stochiometry is increased for greater process efficiency and adequate water removal.

Figure 5:
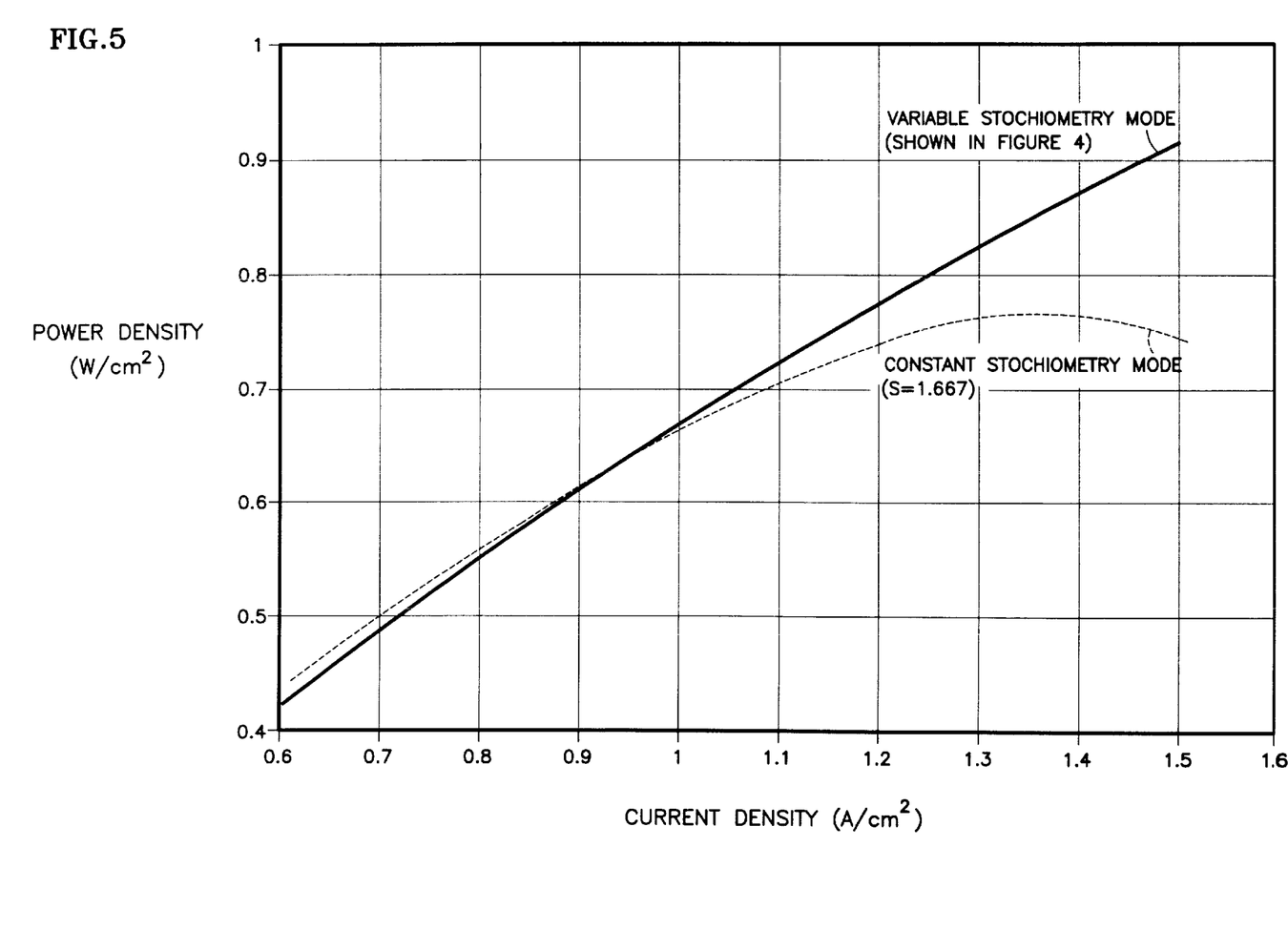
FIG. 5 is a plot of power density as a function of current density for variable stochiometry of the invention and fixed stochiometry of the prior art.

FIG. 5 is a plot of power density as a function of current density for the prior art constant stochiometry mode and for the variable stochiometry mode of the present invention. The maximum current density obtained with the variable stochiometry method of operation is approximately 20 percent higher than for the constant stochiometry mode. A cell stack assembly must be sized to satisfy the maximum required power level. A cell stack assembly designed to operate in a system with variable stochiometry will be twenty percent smaller than a cell stack assembly designed to operate in a system with constant stochiometry. This results in a cell stack assembly that is approximately twenty percent smaller in volume and lighter in weight, both of which are critically important for automotive applications where volume and weight are at a premium. This also reduces the cost of the cell stack assembly.

Figure 6:
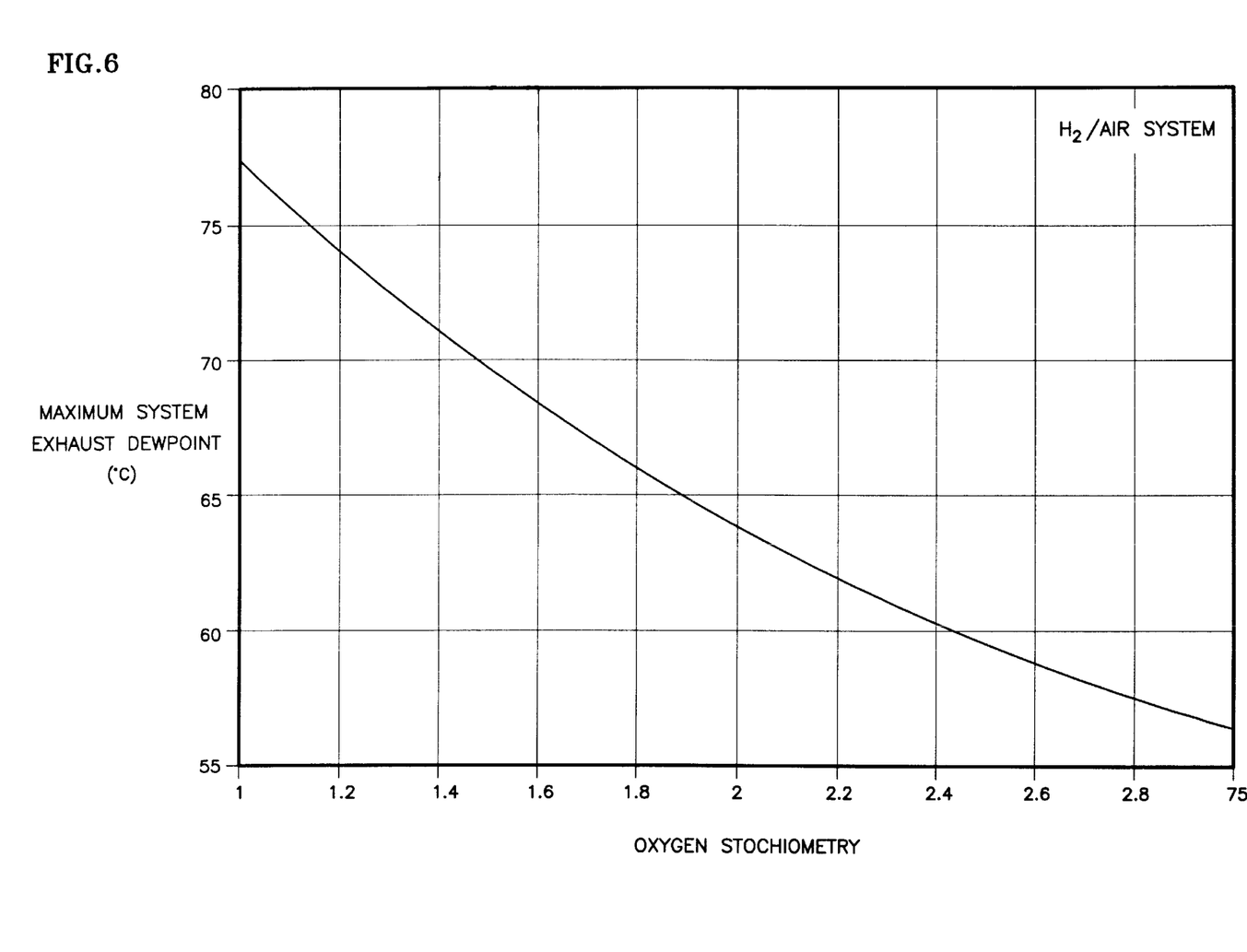
FIG. 6 is a plot of maximum exhaust dew point for a cell stack using the present invention.

Water self sufficiency is a design requirement for any practical fuel cell. Water self sufficiency means that the water that is removed as vapor in the power plant reactant exhaust streams is less than or equal to that produced by the electrochemical reactions within the fuel cell. It is not practical to periodically replenish water from an external source, due to the high purity requirement of such water to prevent degradation of the proton exchange membrane. FIG. 6 shows the maximum allowable system exhaust temperature, or dew point, required to maintain water self sufficiency as a function of stochiometry for a hydrogen-air fuel cell operating at essentially atmospheric pressure. The maximum system reactant exhaust temperature is typically 5° C. higher than the coolant exit temperature from the radiator. The variable stochiometry approach results in water self sufficiency at higher system exhaust temperatures which translates to higher allowable radiator exit temperatures. This permits satisfying hot weather driving conditions with smaller radiators.

Figure 7:
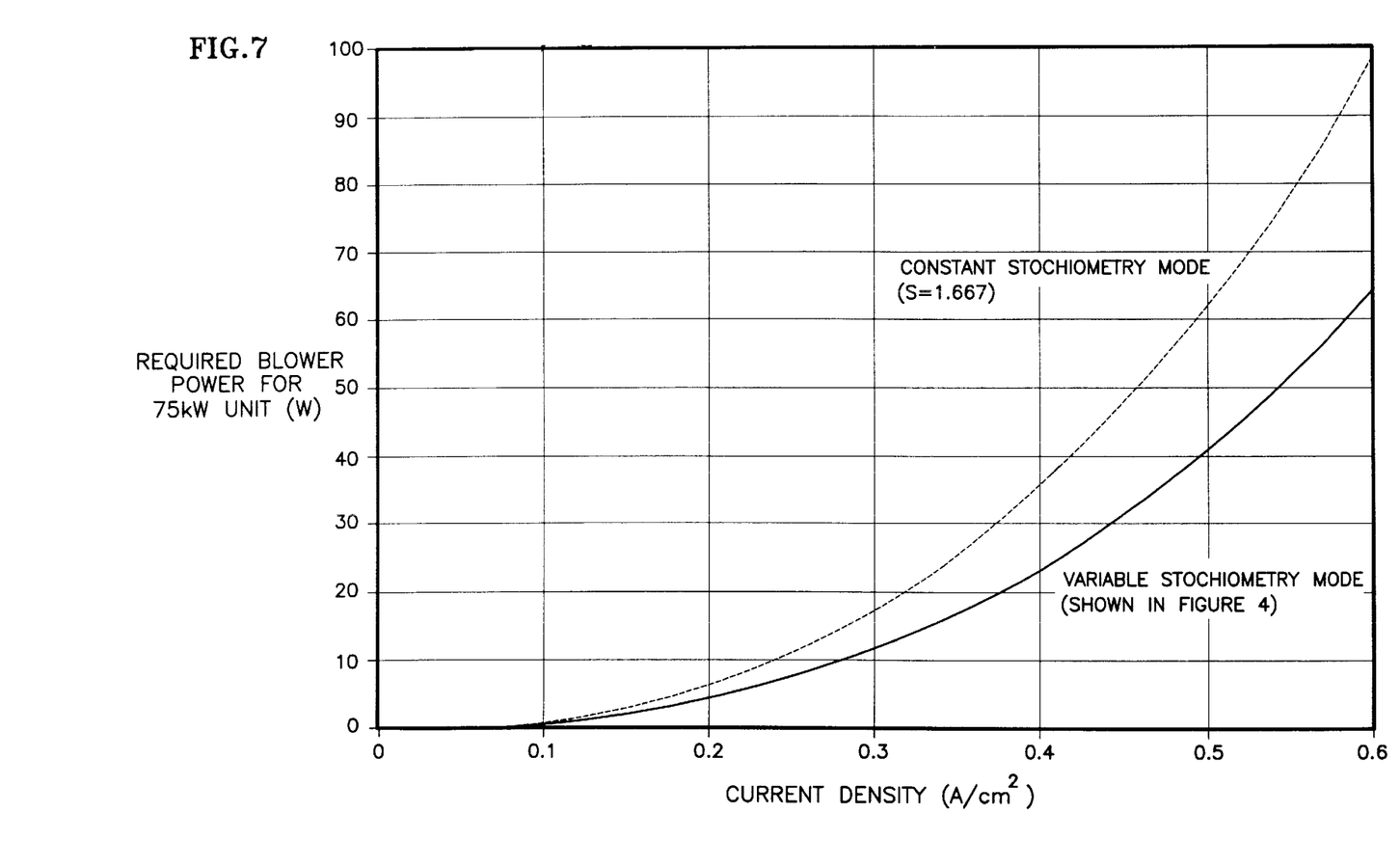
FIGS. 7 and 8 are plots of pump or blower power as a function of current density in accordance with the present invention and the prior art.
Figure 8:
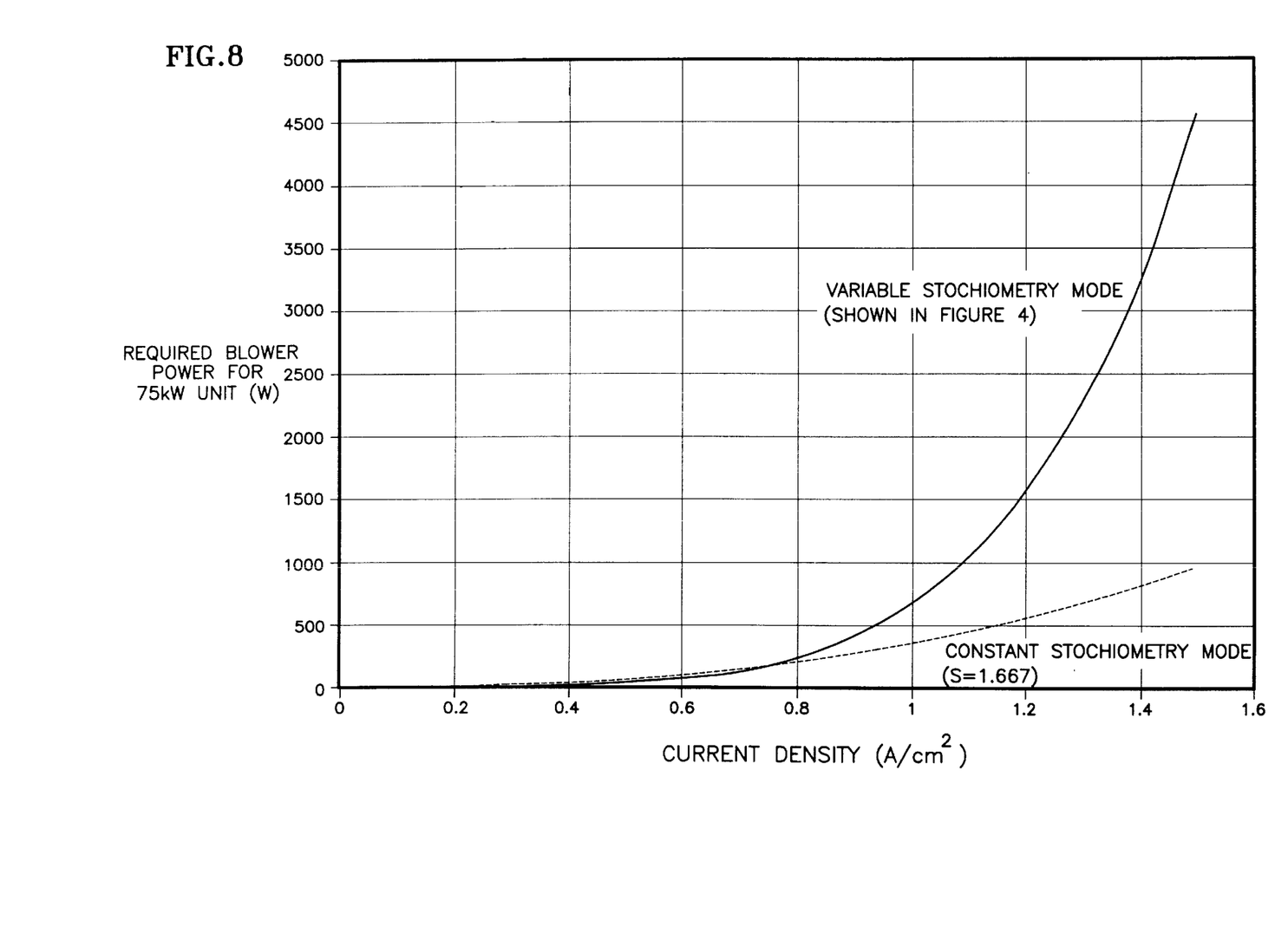

FIG. 7 is a plot of required air blower power for a typical ambient pressure power plant as a function of current density, for current densities below 0.6 amps per square centimeter, for the prior art constant stochiometry case and for the variable stochiometry case of the present invention, using the schedule shown in FIG. 4. Below about 0.6 amps per square centimeter, the blower power is one-third less with the variable stochiometry of the invention. FIG. 8 is a similar plot for current densities up to 1.6 amps per square centimeter. The variable stochiometry approach requires more parasitic power at current densities in excess of about 0.8 amps per square centimeter. Most load-following fuel cells are designed such that the majority of the operating current density is between 0.4 to 0.8 A/cm$^2$, where the present invention is advantageous. Because transients to higher current density are of short duration, such as during the acceleration of an automobile, the additional parasitic power of the variable stochiometry approach at high current densities is acceptable.

Figure 9:
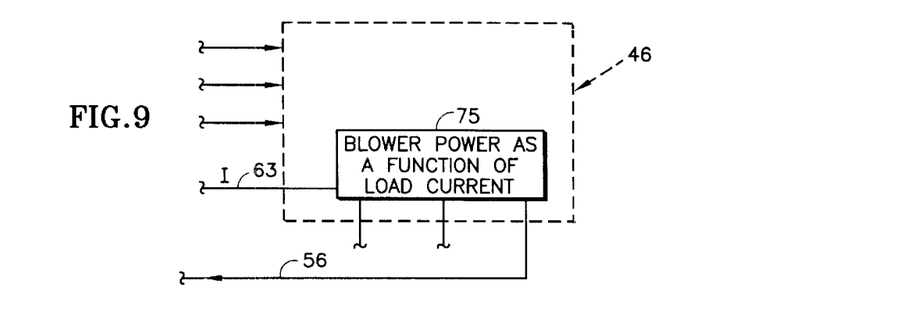
FIG. 9 is a simplified schematic illustration of the straightforward utilization of a schedule of pump or blower power as a function of current in accordance with the present invention.

In FIG. 1, the invention includes having a variable blower 32 that will pump more or less oxidant into the oxidant flow field 24 in dependence upon a control signal on a line 56 which is developed by the controller 46, in response to a current signal (I) on a signal line 63 from a current detector 68 which is responsive to the current provided to the cell stack load 71. In FIG. 9, a portion 75 of the controller 46 is illustrated as devoted to generating the blower control signal on the line 56 directly as a function of the current signal on the line 63, which may be achieved by a simple look-up table. The signal on the line 56 may be either a pulse width control signal, or it may be a voltage or a voltage-indicating signal in dependence upon how the power of the motor within the blower 32 is controlled. All of this is conventional and irrelevant to the overall invention.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of operating a PEM fuel cell system comprising a plurality of fuel cells, each having a cathode support plate, an anode support plate, a membrane electrode assembly disposed between said support plates, oxidant flow fields on the cathode side of said membrane electrode assembly, and fuel flow fields on the anode side of said membrane electrode assembly, said method comprising:

flowing a hydrogen-containing gas through said fuel flow fields;

flowing air at substantially atmospheric pressure through said oxidant flow fields; and controlling the flow rate of air in response to a load current to maintain an air stochiometry, S, of:

$$S=[A+B(i-C)]\pm D, \text{ for } i>C$$
$$S=A\pm D, \text{ for } i\leq C$$

where A is a fixed stochiometry used with current densities greater than, equal to and below i, B is a slope of stochiometry as a function of current density, i is actual current density, C is a current density at which the schedule changes from being fixed to varying with current density, and D is a range of stochiometries between zero and about 20% of A.

2. A method according to claim 1 wherein:
A is in a range of 1.1 to 1.7.

3. A method according to claim 1 wherein:
B is in a range of 1.55 per $A/cm^2$ and 2.22 per $A/cm^2$.

4. A method according to claim 1 wherein:
C is about 0.6 $A/cm^2$.

5. A method according to claim 1 wherein:
i is between zero $A/cm^2$ and 1.5 $A/cm^2$.

6. A method according to claim 1 wherein:
D is 0.3 stochiometry units.

7. A PEM fuel cell system comprising:
a plurality of fuel cells, each having a cathode support plate, an anode support plate, a membrane electrode assembly disposed between said support plates, oxidant flow fields on the cathode side of said membrane electrode assembly, and fuel flow fields on the anode side of said membrane electrode assembly;

a fuel source for providing a hydrogen-rich fuel to said fuel flow fields;

a variable blower for flowing air through said oxidant flow fields at near atmospheric pressure;

a current sensor for providing a load signal indicative of a load current output of said fuel cells; and a controller for providing a power control signal to said blower according to a schedule of blower motor power as a function of load current which will achieve a stochiometry, S, of:

$$S=[A+B(i-C)]\pm D, \text{ for } i>C$$
$$S=A\pm D, \text{ for } i\leq C$$

where A is a fixed stochiometry used with current densities greater than, equal to and below i, B is a slope of stochiometry as a function of current density, i is actual current density, C is a current density at which the schedule changes from being fixed to varying with current density, and D is a range of stochiometries between zero and about 20% of A.

8. A system according to claim 7 wherein:
A is in a range of 1.1 to 1.7.

9. A system according to claim 7 wherein:
B is in a range of 1.55 per $A/cm^2$ and 2.22 per $A/cm^2$.

10. A system according to claim 7 wherein:
C is about 0.6 $A/cm^2$.

11. A system according to claim 7 wherein:
i is between zero $A/cm^2$ and 1.5 $A/cm^2$.

* * * * *